United States Patent

[11] 3,627,050

[72] Inventors: Harold Valentine Hansen, Cordova; Lester Carl Wolf, East Moline, both of Ill.
[21] Appl. No.: 47,621
[22] Filed: June 18, 1970
[45] Patented: Dec. 14, 1971
[73] Assignee: Deere & Company, Moline, Ill.
Continuation of application Ser. No. 720,951, Apr. 12, 1968, now abandoned. This application June 18, 1970, Ser. No. 47,621

[54] SEED CONVEYOR
4 Claims, 3 Drawing Figs.

[52] U.S. Cl. .................................................. 111/77, 221/217
[51] Int. Cl. ................................................... A01c 5/00
[50] Field of Search ........................................ 111/88, 77, 34; 198/212; 221/217, 220; 222/406, 407, 410

[56] References Cited
UNITED STATES PATENTS
3,308,774  3/1967  Keeton ......................... 111/77
3,413,941  12/1968  Roberson ..................... 111/77

Primary Examiner—Robert E. Pulfrey
Assistant Examiner—Stephen C. Pellegrino
Attorney—William A. Murray ABSTRACT: A seed conveyor for a planter having a seed-selecting mechanism of the type having an apertured plate against which individual seeds are slidingly carried until they are ejected through the aperture. The seed conveyor receives the seed discharged through the aperture and conveys the seed to the ground. The conveyor is provided with a plurality of removable rubber paddles mounted upon a wheel. Seeds may be conveyed to the ground individually by using all the paddles, or they may be conveyed to the ground in groups by removing selected paddles.

Patented Dec. 14, 1971

INVENTORS
HAROLD V. HANSEN
LESTER C. WOLF

BY John C. Thompson

ATTORNEY

INVENTORS.
HAROLD V. HANSEN
LESTER C. WOLF

BY

ATTORNEY

SEED CONVEYOR

This is a continuation of application Ser. No. 720,951, now abandoned.

FIELD OF THE INVENTION

The present invention relates generally to agricultural machinery, and more particularly to seed planters and the like wherein one or more seeds are planted in the ground at regularly spaced intervals.

DESCRIPTION OF THE PRIOR ART

When planting corn and similar crops, it is desirable to select individual seeds and plant them in the ground individually (known as drilling) or in small groups (known as hill dropping or checking) at regularly spaced intervals. Virtually all corn planters do this by selecting individual seed kernels with a gravity-filled seed plate mounted in the bottom of a hopper. The seeds are then either dropped directly onto the ground through a seed boot, or means are provided to convey the seed and possibly also to group the seed before it is dropped onto the ground. If the seed is simply dropped onto the ground, the desired spacing may not be obtained since the forward speed imparted to the seed by the planter may cause the seed to bounce in the furrow. Thus, it is desirable to impart a rearward movement to the seed, the rearward movement being about the same as the forward movement of the planter so that the seed will drop directly downwardly into the furrow and not bounce forwardly. The U.S. Pat. No. 3,176,636 issued to Wilcox et al. Apr. 6, 1965 discloses a conveyor chain and valve arrangement which imparts a rearward movement to seeds that have been selected individually. Another form of seed conveyor is shown in the U.S. Pat. No. 3,320,909 issued to Jennings et al. May 23, 1967 and U.S. Pat. No. 3,335,680 issued to Bauman et al. Aug. 15, 1967. In these planters a rotary seed wheel having lobes that contact a seed channel is disposed below the discharge orifice of a seed plate. The seed may be deposited in the ground individually by rotating the wheel at such a speed that only one seed kernel is dropped as each lobe passes the discharge orifice. However, the wheel may be rotated at a slower speed to permit two or more seeds to be grouped and discharged in a hill. To achieve the desired results, however, a valve must be employed to keep the seed within the channel until the lobe contacts the seed and forces it out.

The U.S. Pat. No. 3,308,774 issued to Keeton Mar. 14, 1967 discloses a corn planter which operates on a principle entirely different from those commercially available today. In the Keeton planter, the seeds are engaged by fingers and are slid along a circular plate until they are ejected through a hole in the plate. A compartmented wheel is mounted concentrically with the fingers and behind the plate and carries the seed to a place where it may be discharged into a furrow in the ground. The fins which form the compartment may be removed to permit two or more seeds to be grouped within one compartment. A chamber is disposed below the compartmented wheel, there being a further finned wheel disposed within the lower compartment for actually depositing the seed within the furrow. It has been found that the Keeton seed-selecting system possesses many advantages over the seed selecting and conveying systems commercially available today. However, it has been found that his seed-conveying system does not place the seeds in uniformly spaced-apart distances, and also it cannot place a group of seeds within an area the size of a half-dollar, which is the desired grouping of seed placed within a hill. Also, the Keeton conveying structure is fairly involved and it is desirable that a more simplified structure be provided which has greater reliability and provides for better seed spacing.

SUMMARY OF THE INVENTION

It is an object of the present invention to provide a seed conveyor cooperable with a seed-selecting mechanism of the type shown in the Keeton U.S. Pat. No. 3,308,774.

More particularly, it is an object of the present invention to provide a seed conveyor which can receive individually selected seeds and convey them to a discharge point through which the seed may be discharged directly into a furrow, the seed conveyor having removable fins which permit two or more seeds to be grouped for discharge.

It is another object of this invention to provide a seed conveyor capable of conveying seeds from a seed-selecting mechanism to a furrow, the seed-selecting mechanism having means to group a plurality of seeds into a hill without exterior valve means.

It is a still further object of the present invention to provide a simplified seed conveyor for use with a seed-selecting mechanism of the type shown in the Keeton U.S. Pat. No. 3,308,774, the conveyor being of high durability and providing for accurate placement of the seed.

DESCRIPTION OF THE PREFERRED EMBODIMENT

Figure 1:
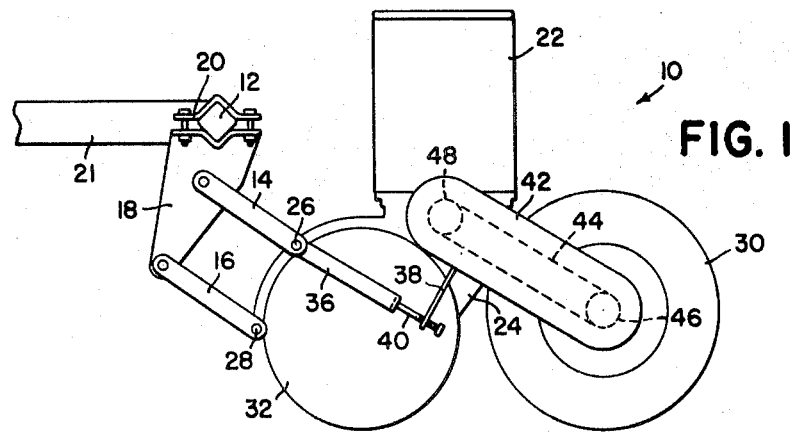
FIG. 1 is a side view of a planter in which the principles of the present invention may be incorporated.

A generally conventional planter 10 is illustrated in FIG. 1. The planter is secured to a tool bar 12 by a mounting structure including upper and lower parallel links 14 and 16 pivotally secured to a mounting frame 18 which is in turn secured to the tool bar 12 by a generally conventional clamp structure 20. The tool bar 12 is in turn secured to the draft links 21 of a tractor in any conventional manner. The planter 10 includes a hopper 22 which has mounted below it a seed boot 24, a portion of which is pivotally secured to the upper and lower links 14 and 16 by means of pivot bolts 26, 28. A press wheel 30 is rotatably carried by an arm (not shown), the forward end of the arm being pivotally secured to an upper portion of the boot 24. An opener, which may be in the form of disk blades 32 (FIG. 1) or a runner 34 composed of runner blades 34a, 34b (FIG. 2), is carried by the lower end of the boot 24. The opening depth of the disks 32 or the runner 34 is gauged by the press wheel 30 or by depth bands (not shown), the depth being controlled by a link 36 secured at its forward end to pivot 26, the rear end of the link 36 being adjustably secured to a bracket 38 by a screw adjuster 40. The bracket 38 is in turn secured to the arm that carries the press wheel 30. A cover 42 is mounted over the press wheel arm and encloses a drive chain 44 which interconnects a drive sprocket 46 mounted on the hub of the press wheel 30 with a driven sprocket 48 which drives a seed-dispensing mechanism carried in either the bottom of the seed hopper 22 or the boot 24. The foregoing structure is well known in the prior art.

Figure 2:
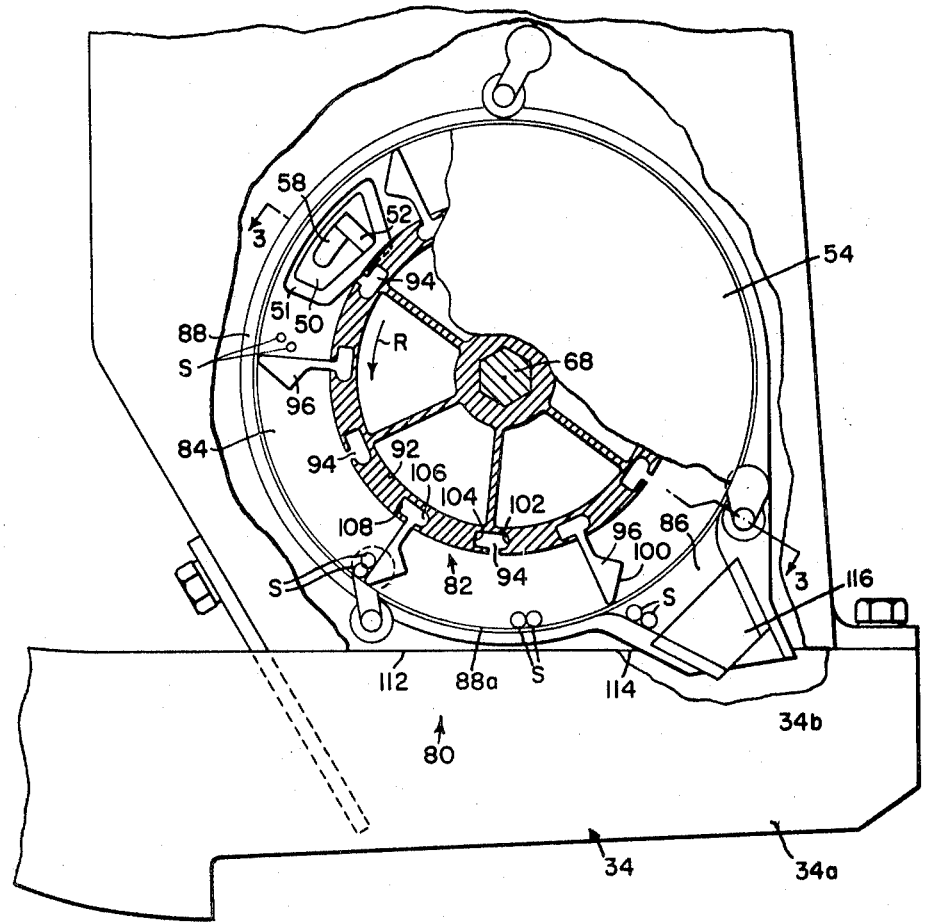
FIG. 2 is a sectional view through a seed boot in which the principles of the present invention have been incorporated, the seed boot carrying a furrow opener in the form of a runner.
Figure 3:
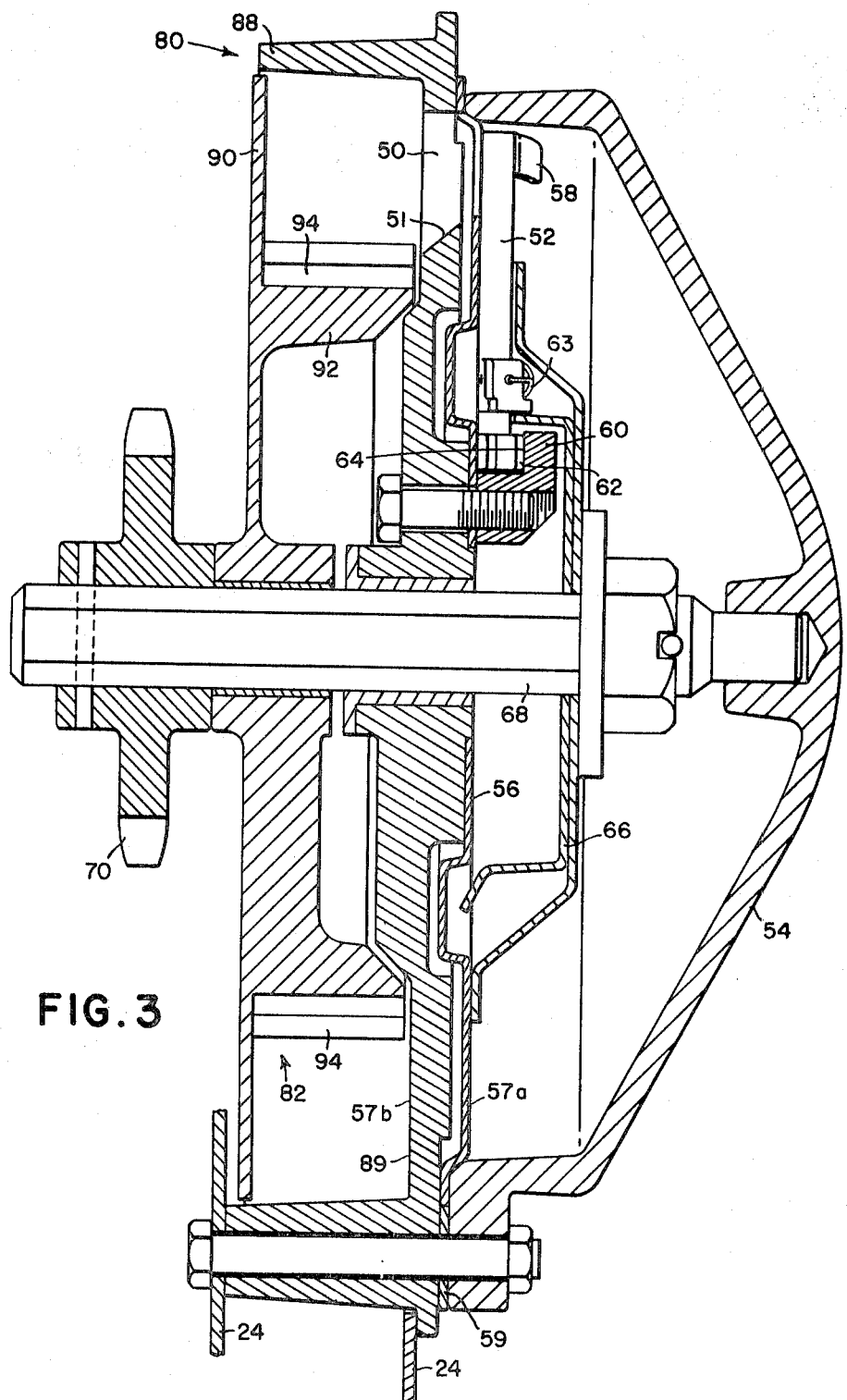
FIG. 3 is a view taken along the lines 3—3 in FIG. 2.

Applicant's preferred seed conveyor, illustrated in FIGS. 2 and 3, is designed to receive seed from a seed-selecting mechanism somewhat similar to that illustrated in the Keeton U.S. Pat. No. 3,308,774. However, it should be noted that individual seeds could be received from other seed-selecting mechanisms than that of the Keeton type.

Referring now more specifically to FIGS. 2 and 3, the seed is discharged through an aperture 50 into applicant's seed-conveying mechanism. The seed is caused to be discharged through the aperture 50 by a spring-biased seed selector 52 that passes through a supply of seed in an auxiliary seed hopper 54, the seed being held in sliding engagement with a plate member 56 by the cell-forming portion 58 of the seed selector 52. The plate member is formed with a hardened steel wear plate 57a backed by an aluminum member 57b, the member 57b being formed with lug portions 59 which are suitably secured in a conventional manner to the boot portion 24. Thus, the plate member 56 is held from rotation. The suds retained by the cell forming portions 58 are normally held in sliding contact with the plate member 56 by the action of a spring 63, but during the loading of the cell portions 58 which occur as the portions pass through the supply of seed in the auxiliary seed hopper, each cell-forming portion 58 is held away from the plate member 56 by the action of a cam 60 whose face 64 engages a cam follower 62 of the seed selector 52. The seed selectors 52 are carried by a carrier 66 which is in turn secured to a rotatable shaft 68. The foregoing seed-selecting structure is more fully set forth in copending application Ser. No. 720,950 filed Apr. 12, 1968. The rotatable shaft 68 is driven from the press wheel 30 of the planter by means of a sprocket 70 fixed on one end of the shaft 68, the sprocket being driven through a chain (not shown) whose other end is disposed over a sprocket concentric with the sprocket 48.

The seed or discharge conveyor is indicated generally at 80. The discharge conveyor consists essentially of a rotary seed impeller, indicated generally at 82. The impeller moves in an annular channel formed to one side of the plate member 56, and being composed in part by a portion 84 having an outer cylindrical wall 88, the left-hand side 89 of the plate member 56, and an outer revolving radial wall 90 formed integrally with the seed impeller 82. The portion 84 has a discharge opening 86 in the wall 88 which defines the terminal portion of the channel. The impeller 82 is mounted for rotation with the shaft 68, and has an axially extending cylindrical portion 92 concentric with the shaft 68, the cylindrical portion 92 being provided with a plurality of uniformly angularly spaced apart axially extending openings or slots 94 which receive rubberlike conveyor fins 96 of special construction. The portion 92 forms the inner units of the aforementioned annular channel. The fins 96 form seed pockets with the channel-forming portion 84 with one fin 96 being a leading wall in advance of the seed and a second fin 96 being a trailing wall in relation to a seed contained in the respective pocket.

As can best be seen by reviewing FIG. 2, as the member 92 rotates in the direction indicated by the arrow R, seeds passing through the inlet 50 will be received in the pockets formed by the fins 96. The member 92 rotates at a rate so that seeds gravitate onto the trailing side of the fin 96 at the leading side of the pocket, are retarded by the leading fins, and are permitted to come to substantial rest on the surface of cylinder 88 at the underside of the discharge device. The seeds S are then discharged through the outlet 86 by engaging the forward inclined surfaces 100 of the fins 96 and which hold them in sliding contact with the outer circular wall 88 prior to reaching the discharge opening 86. The aperture 50 is provided with a beveled surface 51 which cooperates with the flexible fin to prevent damage to the seed.

The member 92 is provided with one slot 94 for each of the seed selectors 52. Thus, if the slots 94 in the member 92 are fully loaded with fins 96, each seed will be individually conveyed by a fin 96 to the discharge point. By removing selected fins 96 from the slots 94, the seed may be discharged in groups or hills. Thus, as illustrated in FIG. 2, every other fin has been removed and two seeds will be grouped together and discharged by the fins through the opening 86. If it were desired to group three seeds together, only every third fin would be left on the conveyor wheel 92.

To make certain that each of the fins 96 is properly assembled within the slots 94, the slot is provided with a forward rounded leading edge 102 and a rectangularly shaped trailing surface 104. The rubber fin is also provided with a rounded leading portion 106 and a rectangular trailing portion 108, the portions 106 and 108 conforming to the surfaces 102 and 104.

It will be apparent from the above description of the construction illustrated in the drawings that the conveyor fins 96 will rotate with the fingers 52. Thus, when the spacing between the cell-forming fingers is less than the desired spacing of individual seeds in the ground, it is then necessary to rotate the seed-selecting mechanism at a relatively slow speed to achieve the desired seed spacing. At this speed, the radial speed of the tip of the fins is less than actual ground speed. If it were desirable to discharge the seed at a speed approximating ground speed, it would then be necessary to increase the rotational speed of the conveyor relative to the seed-selecting mechanism. This could be accomplished simply by rotatably mounting the impeller 82 on the shaft 68 and driving it through a separate chain and sprocket at a faster speed. If the conveyor were driven twice as fast as the selector, then every other fin would be removed, if three times as fast, only every third fin would be retained.

As is clearly shown in FIG. 2, the underside 88a of the outer wall 88 is closely adjacent and substantially at the same height as upper edges 112, 114 of the runner blades 34a, 34b forming the runner 34. Thus, as the seed S passes through the outlet 86, it will fall through a short conduit 116 directly into the furrow between the runner blades. The blades 34a, 34b are relatively short in height and consequently the seeds will not have opportunity to accelerate in their descent through the outlet 86 before they are in the furrow between the blades 34a, 34b. Thus, the seeds will be accurately spaced along the furrow since they will not have momentum built-up as would occur through a large drop between the conveyor and the furrow.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. A discharge assembly for a planter having a seed selector mechanism comprising: wall structure defining a vertical channel having an upper seed inlet for receiving seed from the selector mechanism and a lower discharge outlet for passing seed from the channel to a furrow; a rotatable conveyor supported to rotate about a horizontal axis relative to said wall structure defining a channel and having a plurality of radial walls forming peripheral pockets with the wall structure defining the channel and movable within the structure defining the channel sequentially between the seed inlet and the seed discharge opening, and means rotating said conveyor at a rate to cause seed passing through the inlet to be retarded in its descent by a wall in advance thereof, to come to substantial rest prior to reaching the outlet, and to be swept through the outlet by a wall in trailing relation thereto, and each of said radial walls having a leading surface extending from its end toward the conveyor, the surface being disposed at an acute angle and diverging in an advance direction with respect to the portion of the wall structure defining a vertical channel that is outward of and adjacent the end.

2. A planter assembly comprising: a main supporting structure; a pair of fore-and-aft extending upright ground-penetrating blades having upper edges and carried on the structure in transversely spaced relation with one another for opening a furrow as the structure advances; a housing formed about a horizontal axis and supported on the structure closely adjacent the blades and having an underside thereof being proximate the level of the upper edges of the ground-penetrating blades, the housing further having an upright fixed plate dividing the annular housing into a seed hopper compartment on one side of the plate and a conveyor compartment on the other side of the plate, the conveyor compartment having a lower seed outlet offset to a side of the underside of the housing and disposed between the ground-penetrating blades, said plate having an upper inlet opening affording communication between upper portions of the compartments, a rotary seed selector mechanism supported within the hopper compartment and movable about the horizontal axis, said mechanism having finger elements biased axially toward the plate to hold seed and slide seed against the plate as the finger advances upwardly from the base of the hopper compartment to the inlet opening for depositing seed into the conveyor compartment; a rotary conveyor supported within the conveyor compartment having angularly spaced compartments movable first past the inlet opening for receiving the seed therefrom, from thence to said underside, and from thence past said underside to said outlet for depositing the seed into the furrow opened by the blades; and drive means for rotating the rotary conveyor.

3. A planter assembly comprising: a main supporting structure; a pair of fore-and-aft extending upright ground-penetrating blades carried on the structure in transversely spaced relation with one another for opening a furrow as the structure advances; a housing formed about a horizontal axis and supported on the structure adjacent the ground-penetrating blades and having an underside thereof proximate the ground level, the housing further having an upright fixed plate dividing the housing into a seed hopper compartment on one side of the plate and a conveyor compartment on the other side of the plate, the conveyor compartment having a lower seed outlet offset to a side of the underside of the compartment and disposed between the ground-penetrating blades, said plate having an upper inlet opening affording communication between upper portions of the compartments; a rotary seed selector mechanism supported within the hopper compartment and movable about the horizontal axis, said mechanism having elements for advancing the seed upwardly from the base of the hopper compartment to the inlet opening and depositing seed into the conveyor compartment; a rotary conveyor supported within the conveyor compartment having angularly spaced compartments movable first past the inlet opening for receiving seed therefrom, from thence to said underside, and from thence past said underside to said outlet for depositing the seed into the furrow opened by the ground-penetrating blades; and drive means for rotating the rotary conveyor.

4. The structure as set forth in claim 3 in which the angularly spaced compartments are formed of a plurality of radial fins movable within the conveyor compartment; and said rotary conveyor rotates to move the fins sequentially past the seed inlet and from thence downwardly past said underside, and from thence to the seed outlet, and said rotary conveyor is rotated at a rate so that a seed moving through the inlet opening is retarded in its descent by a fin in advance thereof, it comes to substantial rest in the conveyor compartment at said underside and it is swept through the outlet by a fin in trailing relation thereto.

* * * * *